(12) United States Patent
Sekizawa

(10) Patent No.: US 7,224,268 B2
(45) Date of Patent: May 29, 2007

(54) VEHICLE POSITIONING CONTROL APPARATUS

(75) Inventor: Takatoshi Sekizawa, Obu (JP)

(73) Assignee: Denso Corporation, Kariya (JP)

( * ) Notice: Subject to any disclaimer, the term of this patent is extended or adjusted under 35 U.S.C. 154(b) by 213 days.

(21) Appl. No.: 11/119,693

(22) Filed: May 3, 2005

(65) Prior Publication Data
US 2005/0253695 A1 Nov. 17, 2005

(30) Foreign Application Priority Data
May 12, 2004 (JP) ............................. 2004-142278

(51) Int. Cl.
B60C 23/00 (2006.01)

(52) U.S. Cl. .................. 340/442; 340/444; 340/447

(58) Field of Classification Search ................ 340/442, 340/443, 444, 446, 447, 506; 73/146.2, 146.3, 73/146.4, 146.5, 105; 701/1, 36, 37
See application file for complete search history.

(56) References Cited

U.S. PATENT DOCUMENTS 6,079,799 A 6/2000 Sawada et al. ............. 303/146
6,359,556 B1 * 3/2002 Katou ........................ 340/506
6,498,967 B1 * 12/2002 Hopkins et al. ................ 701/1
6,568,259 B2 5/2003 Saheki et al. ................. 73/146
7,032,436 B2 * 4/2006 Yokota et al. ................ 73/105

FOREIGN PATENT DOCUMENTS

JP A-9-150612 6/1997
JP A-2000-255228 9/2000

* cited by examiner

Primary Examiner—Van T. Trieu
(74) Attorney, Agent, or Firm—Posz Law Group, PLC (57) ABSTRACT

A vehicle positioning control apparatus includes a vehicle positioning detection device, a vehicle positioning sudden change detection device, a tire air pressure reduction detection device, and a plurality of tire air pressure adjustment mechanisms. The vehicle positioning detection device detects a physical quantity indicating a positioning of a vehicle. The vehicle positioning sudden change detection device detects sudden changes in the positioning based on the physical quantity. The tire air pressure reduction detection device detects which of a plurality of wheels has undergone a reduction in tire air pressure. When a sudden change in positioning is detected, all wheels other than the wheel having undergone a reduction in pressure are designated as pressure reduction target wheels. The tire air pressure of the pressure reduction target wheels is reduced by the tire air pressure adjustment mechanisms.

7 Claims, 8 Drawing Sheets

VEHICLE POSITIONING CONTROL APPARATUS

CROSS REFERENCE TO RELATED APPLICATIONS

This application is based upon and claims the benefit of priority of Japanese Patent Application No. 2004-142278, filed on May 12, 2004, the contents of which are incorporated herein by reference.

FIELD OF THE INVENTION

The present invention relates to a vehicle positioning control apparatus for stabilizing a vehicle by controlling the tire air pressure.

BACKGROUND OF THE INVENTION

Conventional methods for controlling vehicle positioning include anti-lock braking systems (ABS) control and vehicle stability control systems for preventing sideslip. Under ABS control, the wheels fitted to the vehicle are prevented from locking in the case of tire slip. This is achieved by controlling the braking force generated at each wheel so that the wheel speed conforms to a target wheel speed, thereby regulating a slip ratio. Vehicle stability control systems are designed to prevent oversteer or understeer of the vehicle. This is achieved by applying additional braking force to a target wheel or wheels to enable the vehicle to follow an ideal trajectory. Japanese Patent Laid-Open Publication No. Hei 11-20648 discloses one such system.

However, a conventional vehicle positioning control apparatus for ABS control or vehicle stability control or the like may be unable to cope with situations where a very sudden change in positioning causes the vehicle to spin such as the case of a blown tire. Therefore a vehicle positioning control system that is also able to control the positioning of the vehicle under these types of extreme situations would be very desirable.

SUMMARY OF THE INVENTION

The present invention takes the above issues into consideration, with an object of providing a vehicle positioning control apparatus that is able to stabilize the positioning of a vehicle, even in situations of very sudden change in the vehicle positioning, such as the change that occurs when a blown tire causes the vehicle to spin.

A first aspect of the present invention provides an apparatus wherein a sudden change in vehicle positioning is detected by a vehicle positioning sudden change detection means. All the wheels of the vehicle other than the wheel detected by a tire air pressure reduction detection means are designated as pressure reduction target wheels. At each of these designated pressure reduction target wheels, the tire air pressure is reduced by a tire air pressure adjustment mechanism provided at that particular pressure reduction target wheel.

In such a configuration, when the vehicle positioning suddenly changes, as in the case of a blown tire, the tire air pressure adjustment mechanism provided at each of the pressure reduction target wheels reduces the tire air pressure at that wheel. This allows the vehicle to adapt to sudden positioning changes such as a vehicle spin, thereby stabilizing the positioning of the vehicle.

In another aspect of the present invention, a sideslip angle of the vehicle is used as a physical quantity for indicating the positioning of the vehicle. When this sideslip angle exceeds a predetermined threshold, the vehicle is deemed to have undergone a sudden positioning change.

In a yet another aspect of the present invention, the tire air pressure reduction detection means detects whether the vehicle is in a state of oversteer or a state of understeer based on the sideslip angle detected by a sideslip angle detection means, thereby detecting a reduction in the tire air pressure.

In this manner, a reduction in tire air pressure can be detected on the basis of the vehicle state, as determined by the sideslip angle.

In a yet another aspect of the present invention, air pressure within each tire is detected by a tire air pressure detection means. The tire air pressure reduction detection means detects a reduction in tire air pressure based on the tire air pressure detected by the tire air pressure detection means.

Hence, a reduction in tire air pressure can also be detected on the basis of the actual tire air pressure, as determined by the tire air pressure detection means.

In still another aspect of the present invention, when a reduction in tire air pressure is detected by the tire air pressure reduction detection means, a signal is sent to a transmitter to reduce tire air pressure. The tire air pressure is reduced by opening an air valve using the tire air pressure adjustment mechanism.

In this manner, the tire air pressure can be reduced by opening the air valve using the tire air pressure adjustment mechanism provided at the transmitter.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

The following is a description of embodiments of the present invention with reference to the drawings. In the following embodiments, those portions that are either identical or equivalent are labeled with the same reference numerals or symbols in the figures.

Figure 1:
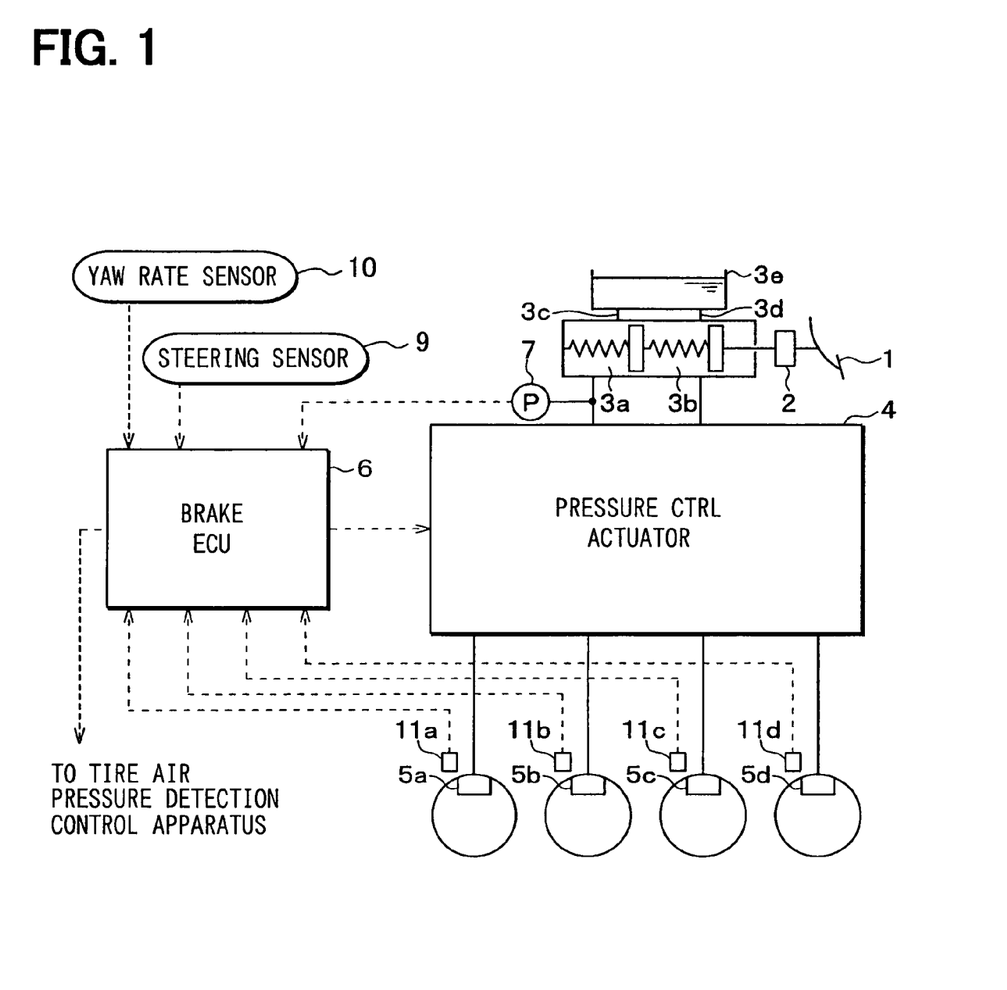
FIG. 1 is a block diagram of a brake apparatus applied to a vehicle positioning control apparatus according to a first embodiment of the present invention.
Figure 2:
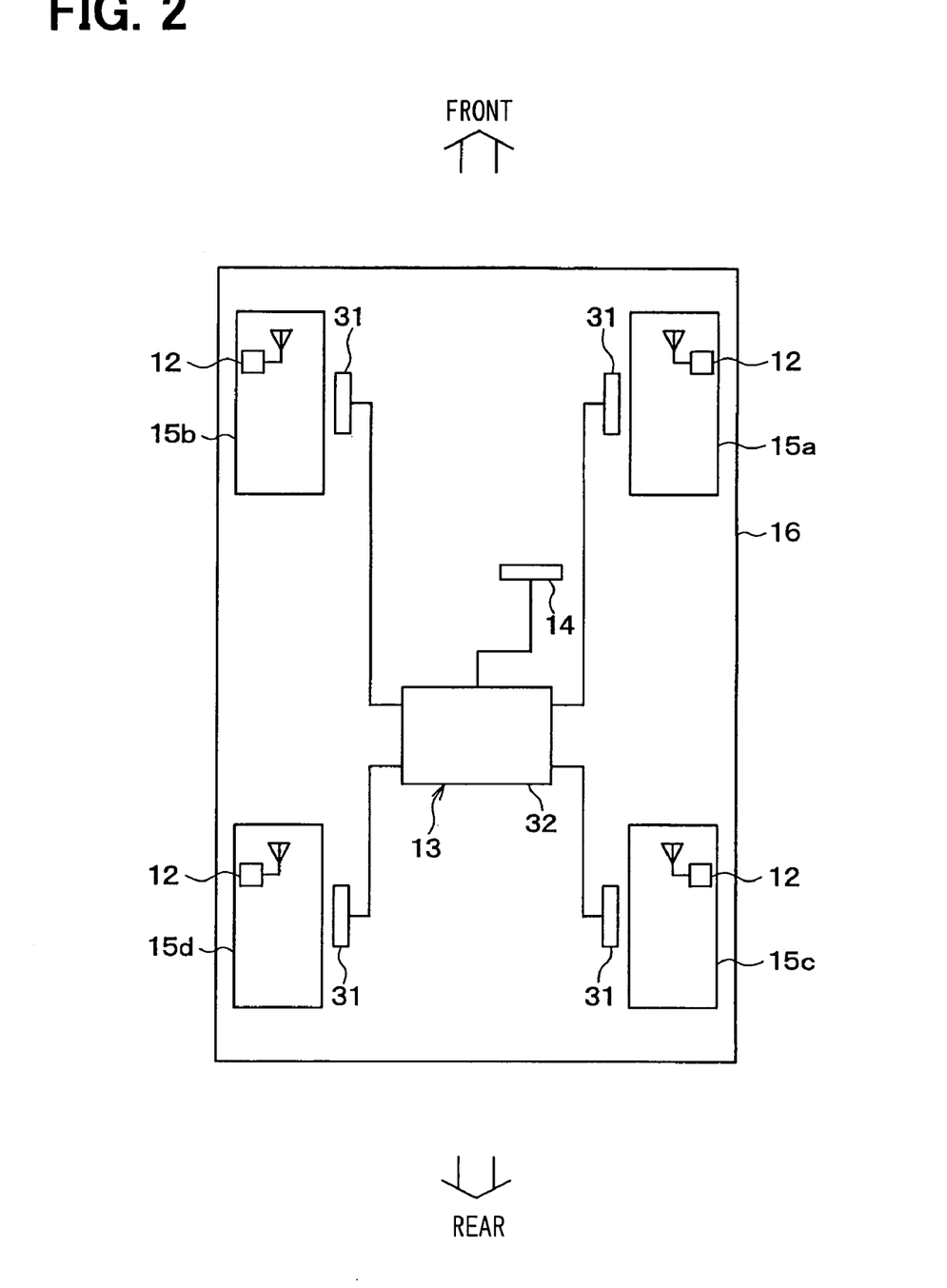
FIG. 2 is a block diagram of a tire air pressure detection control apparatus applied to the vehicle positioning control apparatus of the first embodiment.

FIG. 1 is a block diagram of a brake apparatus applied to a vehicle positioning control apparatus according to a first embodiment of the present invention. FIG. 2 is a block diagram of a tire air pressure detection control apparatus applied to the vehicle positioning control apparatus.

The brake apparatus shown in FIG. 1 represents, for example, a four-wheeled rear wheel drive vehicle including a double piping system (X piping system) incorporating a first piping system and a second piping system. The first piping system controls the braking of the left front and right rear wheels. The second piping system controls the braking of the right front and left rear wheels.

A brake pedal 1, which is pressed by the driver of the vehicle to apply the brakes, is connected via a booster 2 to a master cylinder 3 that functions as a brake fluid pressure generation source. When the driver depresses the brake pedal 1, a master piston disposed inside the master cylinder 3 is pressed, thereby generating a master cylinder pressure (hereafter abbreviated as M/C pressure). This master cylinder 3 is divided into a primary chamber 3a and a secondary chamber 3b. The primary chamber 3a generates the brake fluid pressure transmitted to the first piping system. The secondary chamber 3b generates the brake fluid pressure transmitted to the second piping system.

Furthermore, the master cylinder 3 is also equipped with a master reservoir 3e. The master reservoir 3e includes connecting passages 3c and 3d that connect with the two chambers of the master cylinder 3. This master reservoir 3e supplies brake fluid to the master cylinder 3 via the connecting passages 3c and 3d and also stores excess brake fluid from inside the master cylinder 3.

The primary chamber 3a and the secondary chamber 3b in the master cylinder 3 are connected to wheel cylinders 5a to 5d provided at each of the vehicle wheels via a brake fluid pressure control actuator 4. The first and second piping systems are provided within the brake fluid pressure control actuator 4. The first piping system incorporates brake piping for connecting the primary chamber 3a with the wheel cylinders 5a and 5c of the left front wheel and the right rear wheel, respectively. The second piping system incorporates brake piping for connecting the secondary chamber 3b with the wheel cylinders 5b and 5d of the right front wheel and the left rear wheel, respectively.

The first and second piping systems are each equipped with conventional structural components such as electromagnetic valves, a pump, and a motor for driving the pump, and are designed so as to automatically apply pressure (hereafter referred to as W/C pressure) to the wheel cylinders 5a to 5d provided at each of the wheels. By employing this type of brake fluid pressure control actuator 4, not only can ABS control be conducted when the brake pedal 1 is depressed, but vehicle stability control can also be executed even if the brake pedal 1 is not depressed. The construction of this brake fluid pressure control actuator 4 is based on conventional technology, and as such, is not described in detail.

Furthermore, the brake apparatus also includes a brake ECU 6. The brake ECU 6 outputs control signals for driving each of the structural components of the brake fluid pressure control actuator 4 and control signals for the tire air pressure detection control apparatus. This brake ECU 6 receives input from a pressure sensor 7 that detects the M/C pressure generated in the master cylinder 3 and from a variety of other sensors fitted to the vehicle. These other sensors include a steering sensor 9 for detecting the steering angle, a yaw rate sensor 10 for detecting the yaw angle of the vehicle, and wheel speed sensors 11a to 11d for detecting the rotational state of each of the wheels. Based on the detection signals received from these sensors, the brake ECU 6 performs a variety of calculations and determinations. The brake ECU 6 then generates control signals for driving each of the structural components of the brake fluid pressure control actuator 4 and control signals for transmission to the tire air pressure detection control apparatus.

The vehicle tire air pressure detection control apparatus shown in FIG. 2 is fitted to the vehicle and includes transmitters 12, a receiver 13, and a warning portion 14.

As shown in FIG. 2, the transmitters 12 are fitted to the wheels 15a to 15d of the vehicle 1 and perform two roles. Firstly, the transmitters 12 detect the air pressure within the tires fitted to the wheels 15a to 15d and transmit detection signal data, which is stored within a transmission frame, reflecting these detection results. Secondly, the transmitters 12 receive tire air pressure control signals sent from the receiver 13 and adjust the tire air pressure accordingly. The receiver 13 is fitted to the vehicle body 16 and also performs two roles. Firstly, the receiver 13 receives transmission frames from the transmitters 12 and determines the tire air pressure by conducting a variety of processes and calculations based on the detection signal data stored within the transmission frame. Secondly, the receiver 13 sends tire air pressure control signals to the transmitters 12 based on control signals received from the brake ECU 6.

Figure 3A:
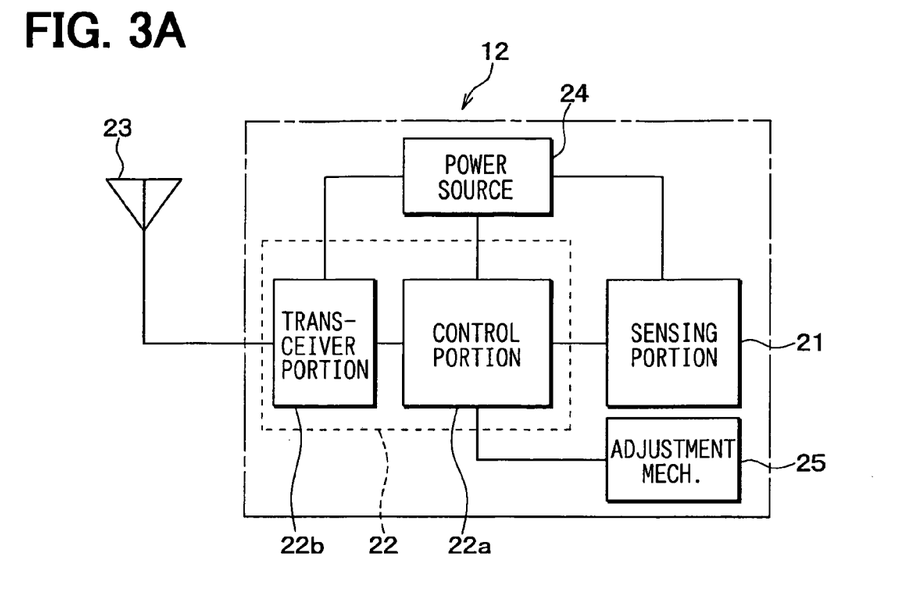
FIGS. 3A and 3B are block diagrams of a transmitter and a receiver, respectively, in the tire air pressure detection control apparatus of FIG. 2.
Figure 3B:
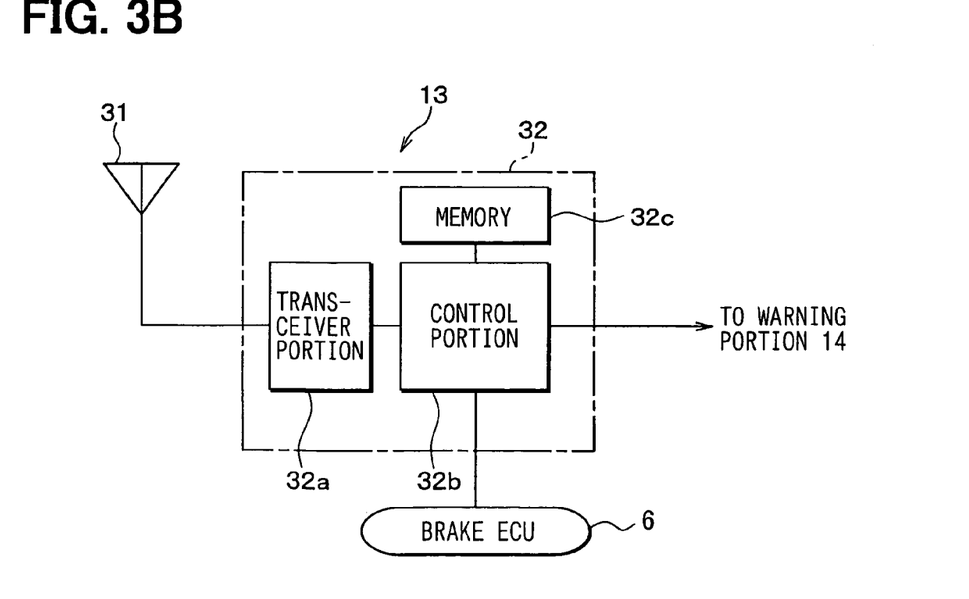
Figure 4:
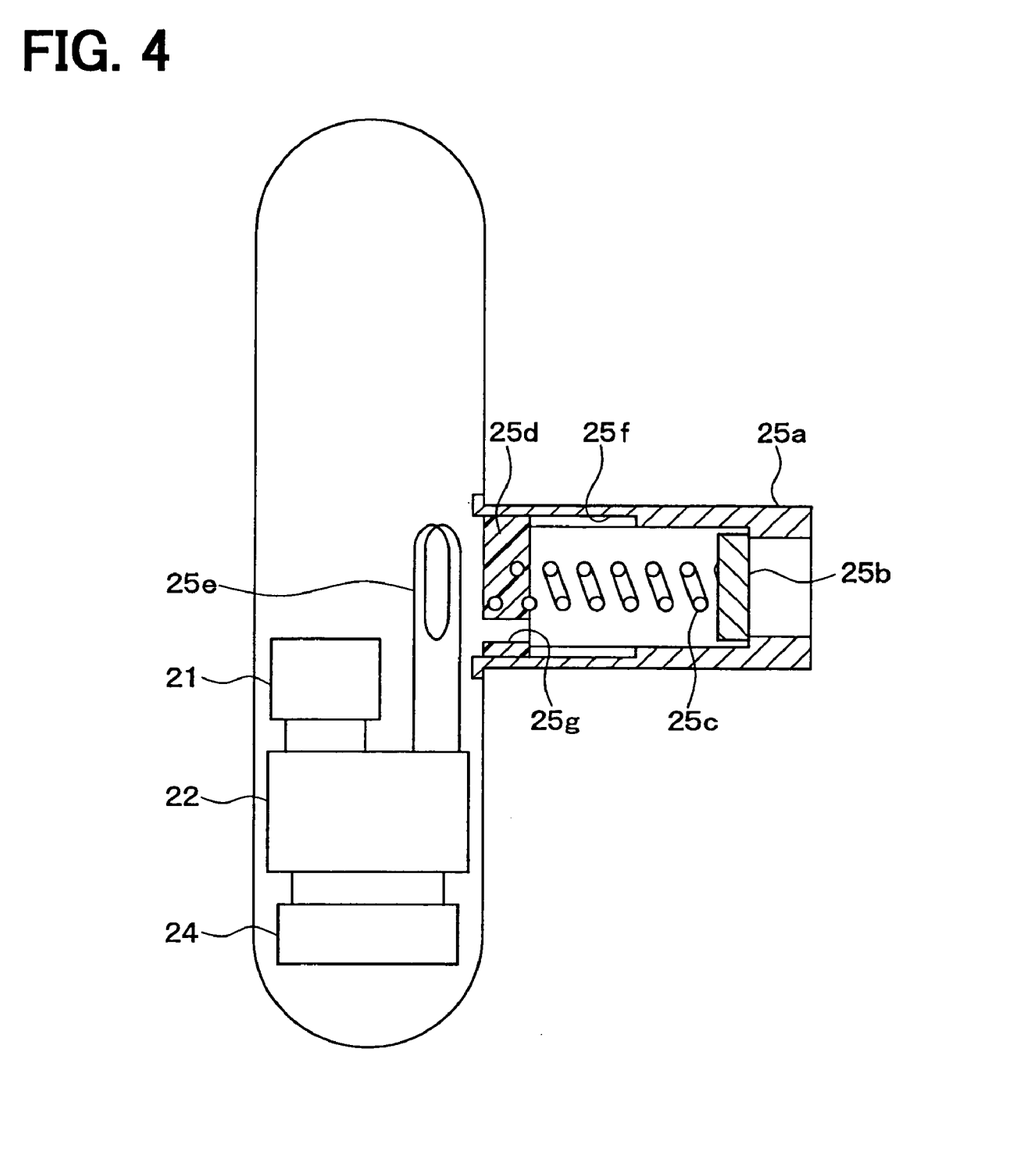
FIG. 4 is a partial cross-sectional view of the transmitter of FIG. 3A.

FIG. 3A and FIG. 3B are block diagrams of a transmitter 12 and the receiver 13, respectively. Furthermore, FIG. 4 is a schematic illustration showing a partial cross-section of a transmitter 12. The transmitter 12 and the receiver 13 are described below in detail, with reference to these figures.

As shown in FIG. 3A and FIG. 4, each transmitter 12 includes a sensing portion 21, a microcomputer 22, an antenna 23, a power source 24, and a tire air pressure adjustment mechanism 25. The transmitter 12 operates via power supplied from the power source 24.

The sensing portion 21 may include, for example, a diaphragm-based pressure sensor and a temperature sensor. The sensing portion 21 outputs a detection signal based on the tire air pressure and another detection signal based on the temperature.

The microcomputer 22 is a conventional device incorporating a CPU, ROM, RAM, I/O and the like, and includes a control portion (a first control portion) 22a and a transceiver portion 22b. The microcomputer 22 executes predetermined processing in accordance with a program stored within the ROM.

The control portion 22a receives detection signals form the sensing portion 21, performs predetermined signal processing where required, and then stores each signal as data that shows the detection result, together with ID information that identifies the wheel 15a to 15d to which the transmitter 12 is fitted, within a transmission frame. Subsequently, the control portion 22a transmits the transmission frame to the receiver 13 via the transceiver portion 22b. The processing for sending the transmission frame to the receiver 13 is executed in accordance with the aforementioned program.

Furthermore, the control portion 22a also drives the tire air pressure adjustment mechanism 25 to adjust the tire air pressure based on a tire air pressure control signal from the receiver 13, which is received via the antenna 23 and the transceiver portion 22*b*.

The transceiver portion 22*b* performs the functions of both input portion and output portion. As an input portion, the transceiver portion 22*b* receives electromagnetic waves including a tire air pressure control signal via the antenna 23 and sends this signal to the control portion 22*a*. As an output portion, the transceiver portion 22*b* transmits a transmission frame received from the control portion 22*a* to the receiver 13.

The power source 24 supplies the power required for driving the sensing portion 21, the microcomputer 22, and the tire air pressure adjustment mechanism 25 fitted to the transmitter 12.

As shown in FIG. 4, the tire air pressure adjustment mechanism 25 comprises a cylinder portion 25*a*, a lid 25*b*, a spring 25*c*, a resin portion 25*d*, and a coil 25*e*.

The cylinder portion 25*a* forms the air injection port of the air valve. In the inner wall surface of this cylinder portion 25*a* are formed guide channels (not shown in the figure) enabling the lid 25*b* to slide smoothly and an air flow channel 25*f* enabling air injection and air removal. Both types of channel are formed parallel to the axial direction of the cylinder portion 25*a*. The end of the cylinder portion 25*a* is formed with a narrower diameter than the lid 25*b*, thereby functioning as a stopper for the lid 25*b*.

The lid 25*b* is formed from metal and is positioned within the hollow interior of the cylinder portion 25*a*. The lid 25*b* can slide along the inner wall surface of the cylinder portion 25*a*, guided by the guide channels formed in the cylinder portion 25*a*. The lid 25*b* is designed so as to contact the inner wall surface of the cylinder portion 25*a* without contacting the air flow channel 25*f* formed in the cylinder portion 25*a*. Accordingly, when the lid 25*b* moves away from the tip of the cylinder portion 25*a*, air injection and air removal are possible via the air flow channel 25*f*.

The spring 25*c* is secured to the resin portion 25*d* at one end, and contacts the lid 25*b* at the other end. This spring 25*c* presses the lid 25*b* towards the tip of the cylinder portion 25*a*.

The resin portion 25*d* is secured to the inner wall of the cylinder portion 25*a* using an adhesive or the like, and holds one end of the spring 25*c*. A through-hole 25*g* is provided in the resin portion 25*d*, and air injection or removal is conducted via this through-hole 25*g*.

The coil 25*e* is driven by a control signal from the control portion 22*a*, and attracts the metal lid 25*b* by generating a magnetic attractive force. This opens the air valve, enabling the removal of air.

A transmitter 12 of the construction described above is provided at the air injection valve of each of the vehicle wheels 15*a* to 15*d*, with the sensing portion 21 exposed inside the corresponding tire. This enables the tire air pressure to be detected, and a transmission frame to be transmitted, via the antenna 23 provided at the transmitter 12, at a predetermined transmission timing that occurs within a predetermined cycle (for example, once per minute).

The receiver 13 conducts a detection of the tire air pressure based on the transmission frame received from the transmitter 12, and makes a determination as to whether or not the tire air pressure needs to be reduced based on a control signal from the brake ECU 6. If the tire air pressure needs reducing, the receiver 13 generates a tire air pressure control signal, which is sent to the transmitter 12. Specifically, the receiver 13 comprises antennas 31 and a microcomputer 32.

The number of antennas 31 corresponds with the number of tires, namely, the number of transmitters 12. Each antenna 31 is positioned on the vehicle body 16, in a position corresponding with one of the transmitters 12. For example, each antenna 31 may be secured to the vehicle body 16 in a position that is a predetermined distance from one of the transmitters 12. Each antenna 31 is a dual-purpose antenna that is capable of transmitting tire air pressure control signals and receiving transmission frames, although separate antennas could also be provided for each role.

The microcomputer 32 is a conventional device incorporating a CPU, ROM, RAM, I/O, and a counter and the like, and as shown in FIG. 3B, comprises a transceiver portion 32*a*, a control portion (a second control portion) 32*b*, and a memory 32*c* formed from a non-volatile EEPROM or the like. The microcomputer 32 executes predetermined processing in accordance with a program stored within the ROM.

The transceiver portion 32*a* performs the functions of both input portion and output portion. As an output portion, it outputs a tire air pressure control signal from the control portion 32*b*, via the antennas 31. As an input portion, it receives transmission frames from each of the transmitters 12, and sends these transmission frames to the control portion 32*b*.

The control portion 32*b* receives control signals from the brake ECU 6 and data showing the detection results from the various sensors via a vehicle LAN (CAN) or the like. Based on these control signals and data, the control portion executes certain predetermined processing, and determines whether or not a tire air pressure control signal needs to be output. If required, the control portion 32*b* then sends an appropriate tire air pressure control signal to the transmitters 12, via the transceiver portion 32*a* and the antennas 31. In addition, the control portion 32*b* also receives transmission frames sent by the transceiver portion 32*a*, and based on the ID information stored within the transmission frame, which identifies the wheel to which the originating transmitter 12 belongs, specifies to which wheel 15*a* to 15*d* the transmission frame applies.

Furthermore, in the control portion 32*b*, the tire air pressure at each of the wheels 15*a* to 15*d* is determined by performing various processing and calculations based on the detection signal data stored within the received transmission frames. The control portion 32*b* then outputs an electrical signal to the warning portion 14 in accordance with the determined tire air pressure values.

Specifically, the control portion 32*b* determines whether or not the tire air pressure has fallen below a predetermined threshold and, if required, outputs a signal to the warning portion 14 indicating a fall in tire air pressure.

The memory 32*c* stores the data showing the results of the calculations performed by the control portion 32*b* together with the tire air pressure detection results for each of the wheels 15*a* to 15*d*.

As shown in FIG. 2, the warning portion 14 is located in a position visible to the driver, and comprises either a warning lamp, a warning display device located within the vehicle instrument panel, or a warning buzzer or the like. On receipt of a signal from the control portion 32*b* of the receiver 13 indicating a fall in tire air pressure, this warning portion 14 issues a warning to alert the driver. This completes the description of the tire air pressure detection control apparatus.

Following is a description of the operation of a vehicle positioning control apparatus comprising both a brake apparatus and a tire air pressure detection control apparatus as described above.

Figure 5:
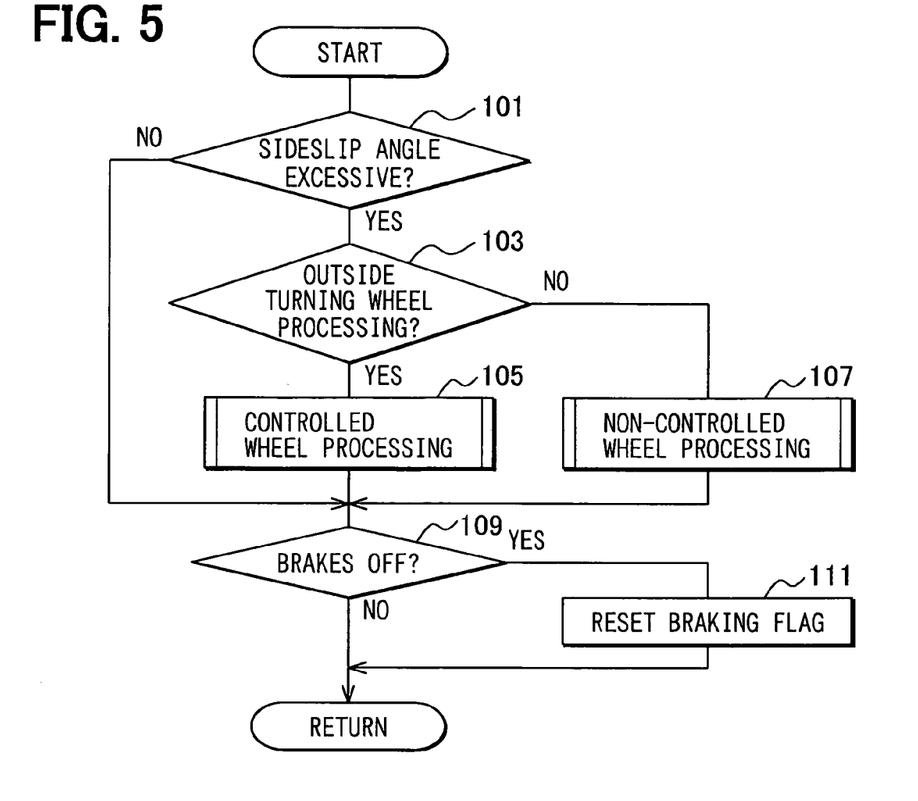
FIG. 5 is a flow chart of a vehicle stability control process according to the present invention.
Figure 6:
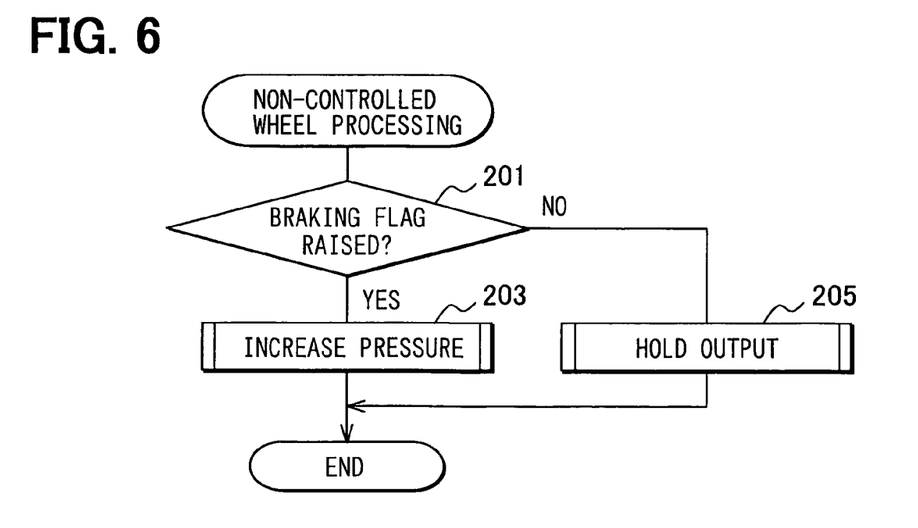
FIG. 6 is a flow chart of a control process of a non-controlled wheel under vehicle stability control according to the present invention.
Figure 7:
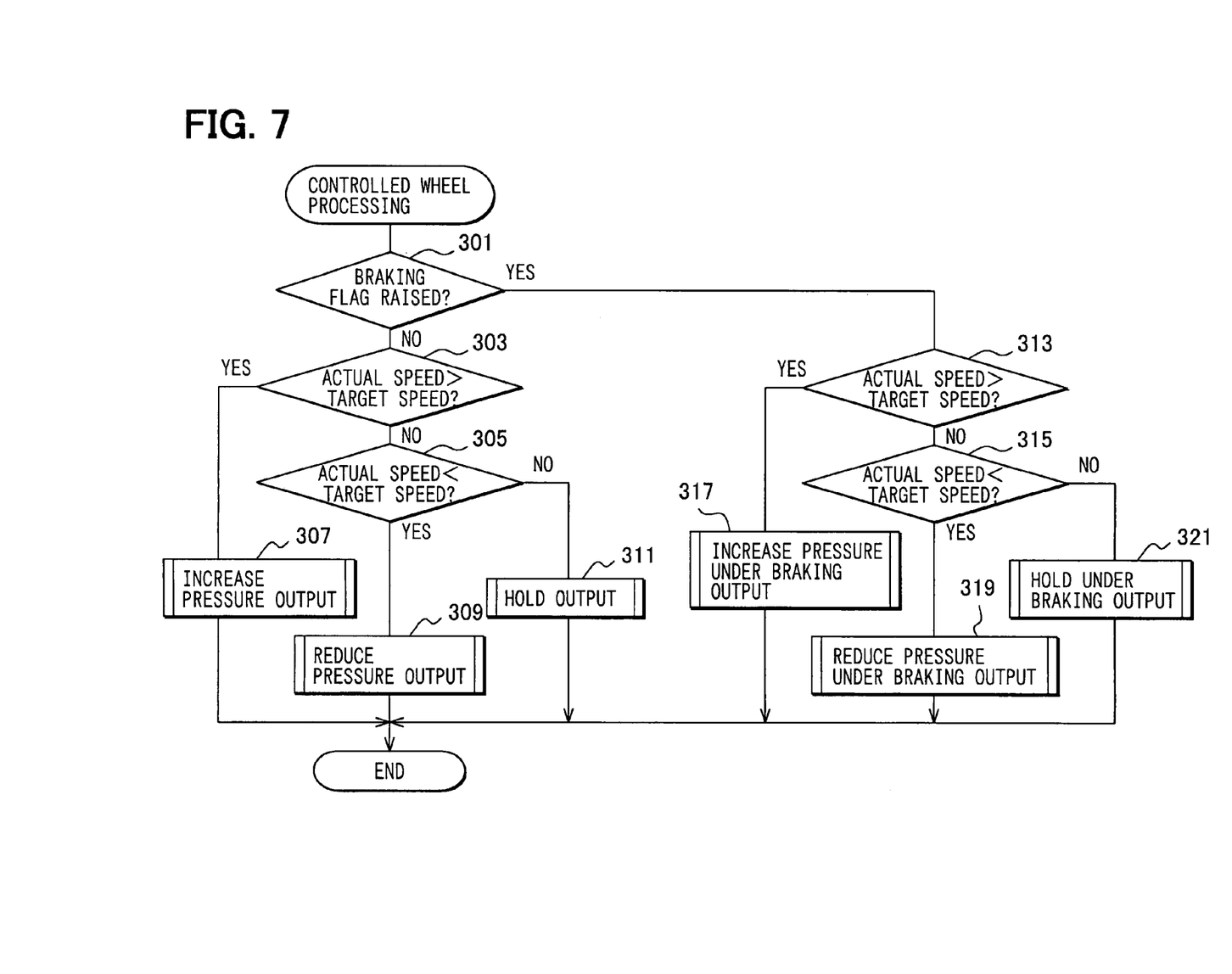
FIG. 7 is a flow chart of a control process of a controlled wheel under vehicle stability control according to the present invention.
Figure 8:
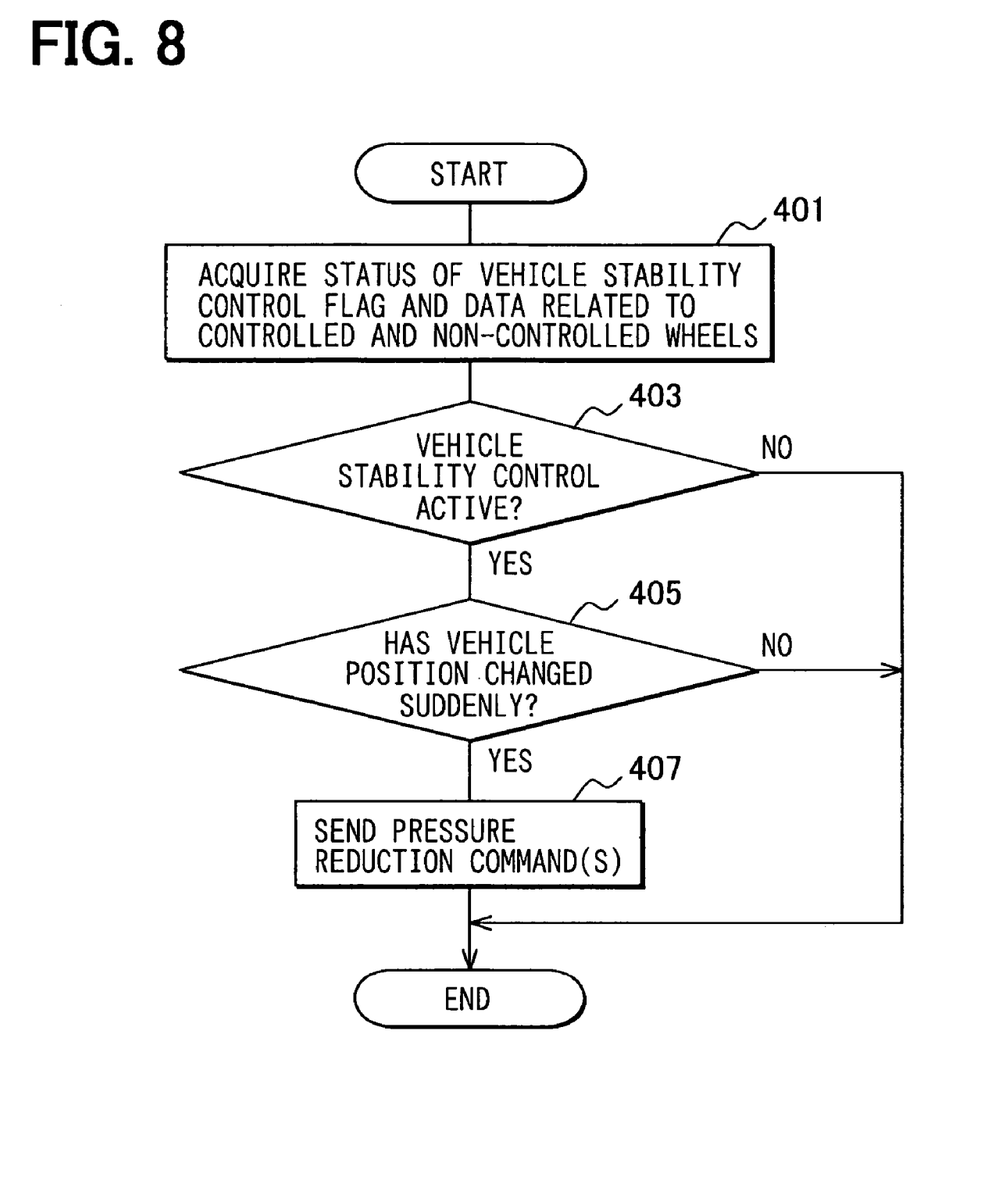
FIG. 8 is a flow chart of a tire air pressure reduction process according to the present invention.

FIG. 5 through FIG. 7 are flow charts showing the processing executed by the brake ECU 6 of the brake apparatus. Furthermore, FIG. 8 is a flow chart showing the processing executed by the control portion 32b of the receiver 13 in the tire air pressure detection control apparatus. Each of the processes executed by the vehicle positioning control apparatus is described below in detail, with reference to these figures.

First, vehicle stability control is executed by the brake ECU 6 in accordance with the flow charts shown in FIG. 5 through FIG. 7. FIG. 5 is a flow chart showing the entire vehicle stability control process. FIG. 6 is a flow chart showing the control of a non-controlled wheel under vehicle stability control. FIG. 7 is a flow chart showing the control of a controlled wheel under vehicle stability control. Each of the vehicle stability control processes shown in these figures is executed continuously while the vehicle is running from the time the vehicle ignition switch is turned on.

When vehicle stability control is executed, the processing shown in FIG. 5 is conducted at each vehicle wheel. For example, when processing has been completed for the left front wheel, the same processing is conducted at the right rear wheel, and so on. When processing has been completed for all the wheels, the processing is repeated from the left front wheel.

Under this vehicle stability control process, if a state of oversteer develops during turning of the vehicle, then by applying a braking force to either the left or right front wheel, in accordance with the turning direction, the oversteer can be averted. For example, if when turning left, a state of oversteer arises, where the actual degree of turn is greater than that required by the targeted turn, as is the case shown in FIG. 9, then a control process is executed that applies a braking force to the right front wheel 15a, as shown by the diagonal lines in the figure.

Figure 9:
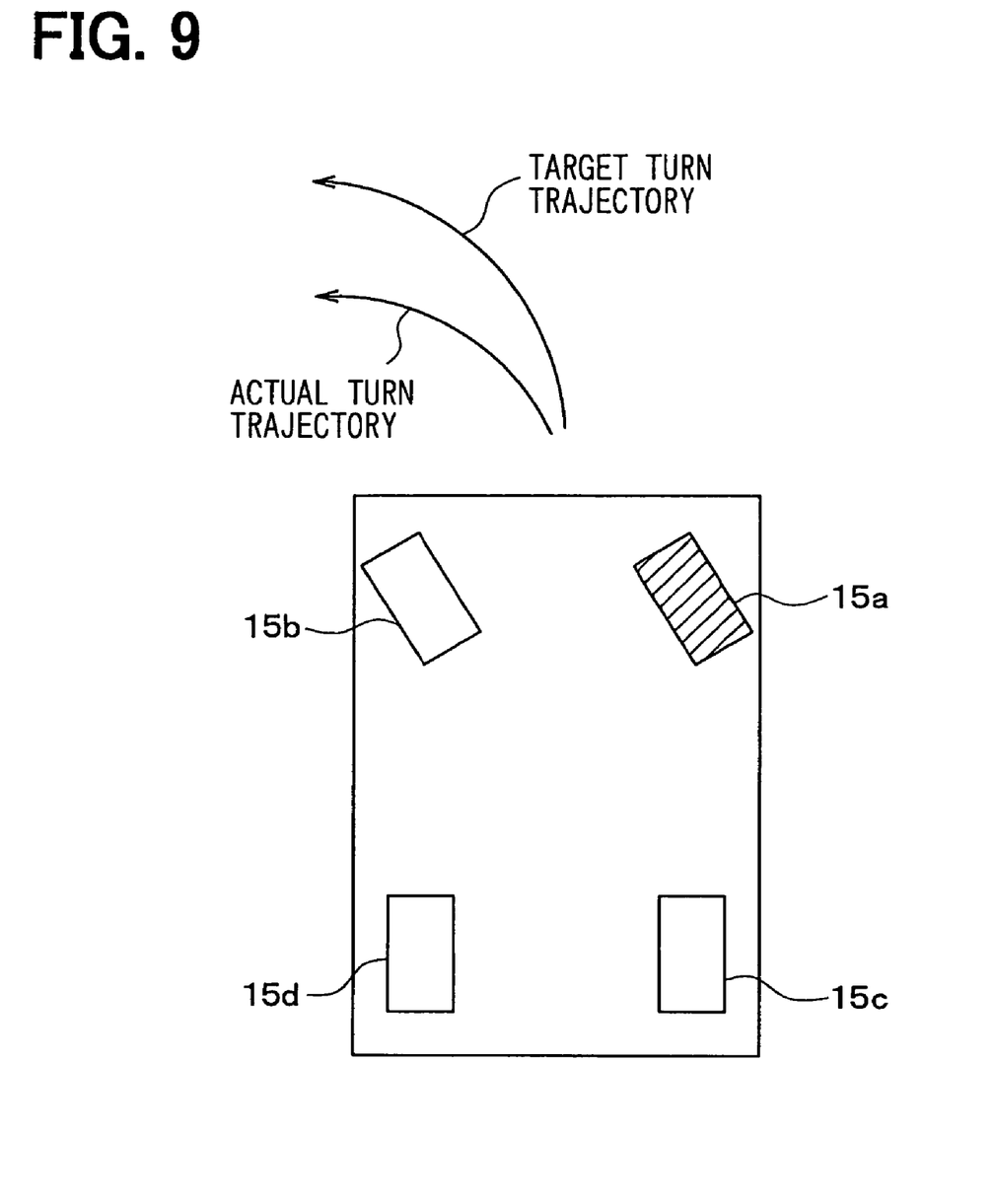
FIG. 9 is a top view of a vehicle trajectory undergoing oversteer.

Similarly, if a state of oversteer arises when turning right, then a control process is executed that applies a braking force to the left front wheel 15b, thus averting the oversteer. In addition, if the vehicle is in a state of understeer, then this state can be averted by executing a control process that applies a braking force to both the left and right rear wheels 15c and 15d.

In the aforementioned control processes for oversteer and understeer, although the wheel or wheels being controlled (hereafter referred to as the controlled wheel) differ, one skilled in the art should appreciate that the actual control technique is the same. Accordingly, the following description focuses only on the case shown in FIG. 9, where oversteer occurs and the vehicle stability control process involves applying a braking force to the right front wheel 15a.

First, in step 101 of FIG. 5, the start conditions for vehicle stability control are adjudged, and a determination is made as to whether or not the sideslip angle of the vehicle has exceeded a predetermined angle. Here, the sideslip angle is defined as being the difference between the actual vehicle turning angle, which is determined from the yaw rate detected by the yaw rate sensor 10, and the target turning angle, which is set on the basis of the steering angle detected by the steering sensor 9, and the vehicle speed detected by the wheel speed sensors 11a to 11d. In this embodiment, the sideslip angle is used as the physical quantity indicating the positioning of the vehicle, but other physical quantities that are generally well-known within the art could also be used.

If the determination at step 101 returns a "Yes" result, then a flag is set indicating the start of vehicle stability control (hereafter, referred to as the vehicle stability control flag), and the process proceeds to step 103. If the determination at step 101 returns a "No" result, then the process advances to step 109.

At step 103, a determination is made as to whether or not the wheel currently undergoing processing is the outside turning wheel. This enables a distinction to be made between the controlled wheel and the non-controlled wheels. Data indicating the controlled and non-controlled wheels is then incorporated within a control signal, which is output to the receiver 13 in the tire air pressure detection control apparatus.

For example, in the case of the oversteer shown in FIG. 9, the right front wheel 15a is identified as the controlled wheel to be subjected to vehicle stability control, and the processing of step 105 is performed on this right front wheel 15a. In contrast, for the other non-controlled wheels, the processing proceeds to step 107. Following completion of the controlled wheel processing conducted on the right front wheel 15a at step 105, the process proceeds to step 109. Furthermore, for the non-controlled wheels 15b through 15d, non-controlled wheel processing is performed in step 107, before the process proceeds to step 109.

In step 109, a determination is made as to whether or not the brakes are currently being applied. This determination is made based on the M/C pressure detected by the pressure sensor 7. In other words, if a command to increase the pressure such as that described below has not been output to the controlled wheel, then the M/C pressure will not increase unless the driver depresses the brake pedal 1. Consequently, when the M/C pressure increases under circumstances where a command to increase the pressure has not been output to the controlled wheel, a braking flag is raised to indicate that the brakes are being applied.

If, in step 109, the determination is made that the brakes are not currently applied, then the braking flag is reset, and the processing for the current wheel ends. The process then shifts to the processing of another wheel. Furthermore, if the brakes are being applied at step 109, then the processing for the current wheel ends, and the process shifts to the processing of another wheel.

Next is a description of the control of a non-controlled wheel and a controlled wheel based on FIG. 6 and FIG. 7, respectively. The following description distinguishes between the case where the brakes are being applied and the case where they are not applied.

In the case of a non-controlled wheel, a determination is made at step 201 of FIG. 6 as to whether or not the brakes are being applied. This determination is made on the basis of whether or not the aforementioned braking flag is raised. If the brakes are not being applied, a "No" result is returned at step 201, the process proceeds to step 205, a hold output is generated, and the process ends.

Under this hold output, the control valves corresponding to the respective non-controlled wheels are closed, thereby maintaining the W/C pressure.

In the case of a controlled wheel, a determination is made at step 301 of FIG. 7 as to whether or not the brakes are being applied. This determination is made in the same manner as for a non-controlled wheel, and returns a "No" result if the brakes are not being applied. The process then proceeds to step 303 and the processing for a non-braking situation is conducted.

At step 303, a determination is made as to whether or not the actual wheel speed of the controlled wheel (in this case, the right front wheel 15*a*) is greater than the target wheel speed. The target wheel speed is preset as the wheel speed corresponding with the current state of the slip angle. In other words, a determination is made as to whether or not the actual wheel speed of the right front wheel 15*a* is greater than this preset target wheel speed.

If a "Yes" result is returned at step 303, then a command to increase the pressure is output at step 307, in order to bring the actual wheel speed closer to the target wheel speed. The process then ends. When this command to increase the pressure is output, the various control valves corresponding with the controlled wheel are operated, enabling the valve positions of these control valves to be adjusted to positions that cause an increase in the W/C pressure.

Furthermore, when this command to increase the pressure is output, the motor fitted to the brake fluid pressure control actuator 4 is also activated, thereby driving the pump. This causes the brake fluid to be suctioned out of the master cylinder 3, and this suctioned brake fluid causes the desired increase in the W/C pressure.

If a "No" result is returned at step 303, then the process proceeds to step 305, and a determination is made as to whether or not the actual wheel speed of the controlled wheel (the right front wheel 15*a*) is less than the target wheel speed. If a "Yes" result is returned, then a command to reduce the pressure is output at step 309, and the process then ends. When this command to reduce the pressure is output, the various control valves corresponding with the controlled wheel are operated, enabling the valve positions of these control valves to be adjusted to positions that cause a reduction in the W/C pressure.

This causes the release of brake fluid that is used to generate the W/C pressure within the wheel cylinders 5*a* to 5*d*, thereby lowering the W/C pressure. As a result, the actual wheel speed at the right front wheel 15*a* approaches the target wheel speed.

If a "No" result is returned at step 305, then the actual wheel speed at the right front wheel 15*a* is deemed to match the target wheel speed, and a hold command is output at step 311. The process then ends. As a result of this hold output, the various control valves corresponding with the controlled wheel are operated, and each control valve is closed, thereby maintaining the W/C pressure. This enables the wheel speed to be maintained.

In the case of a non-controlled wheel, because the brakes are being applied, the determination at step 201 of FIG. 6 returns a "Yes" result. Consequently, the process proceeds to step 203, which includes a command to increase the pressure under braking is output, and the process ends.

When this command to increase the pressure under braking is output, the various control valves corresponding with the non-controlled wheels are operated, enabling the valve positions of these control valves to be adjusted to positions that cause an increase in the W/C pressure, even though the brakes are already being applied. Consequently, when the M/C pressure increases as a result of the action of the driver in depressing the brake pedal 1, the W/C pressure of each of the non-controlled wheels is increased via the piping systems.

In the case of a controlled wheel, because the brakes are being applied, the determination at step 301 of FIG. 7 returns a "Yes" result. As a result, the process proceeds to step 313, and the processing for a braking situation is conducted.

At step 313, a determination is made as to whether or not the actual wheel speed of the controlled wheel (the right front wheel 15*a*) is greater than the target wheel speed. If a "Yes" result is returned at step 313, then a command to increase the pressure under braking is output at step 317, in order to bring the actual wheel speed closer to the target wheel speed. The process then ends. When this command to increase the pressure under braking is output, the various control valves corresponding with the controlled wheel are operated, enabling the valve positions of these control valves to be adjusted to positions that cause an increase in the W/C pressure, even though the brakes are already being applied.

Consequently, when the M/C pressure increases as a result of the action of the driver in depressing the brake pedal 1, the increased M/C pressure can cause an increase in the W/C pressure at the right front wheel 15*a*.

If a "No" result is returned at step 313, then the process proceeds to step 315, and a determination is made as to whether or not the actual wheel speed of the right front wheel 15*a* is less than the target wheel speed. If a "Yes" result is returned at step 315, then a command to reduce the pressure under braking is output at step 319, and the process then ends. When this command to reduce the pressure under braking is output, the various control valves corresponding with the controlled wheel are operated, enabling the valve positions of these control valves to be adjusted to positions that cause a reduction in the W/C pressure.

This process is identical to that which occurs when a command to reduce the pressure is output for a non-controlled wheel. Namely, the W/C pressure corresponding with the controlled wheel is reduced, causing the actual wheel speed at the controlled wheel to approach the target wheel speed.

If a "No" result is returned at step 315, then a hold under braking command is output at step 321. The process then ends. As a result of this hold under braking output, the various control valves corresponding with the controlled wheel are operated, and each control valve is adjusted to a position than enables the W/C pressure to be maintained.

As described above, vehicle stability control is conducted somewhat differently depending on whether or not the brakes are being applied. Sideslip of the vehicle is prevented by bringing the actual wheel speed closer to the target wheel speed, thereby stabilizing the positioning of the vehicle.

In the tire air pressure detection control apparatus, tire air pressure reduction processing is executed by the control portion 32*b* of the receiver 13, in accordance with a flow chart shown in FIG. 8.

First, at step 401, the status of the vehicle stability control flag and data relating to the controlled wheel and the non-controlled wheels are acquired. The vehicle stability control flag is set at step 101 of FIG. 5, and by reading the status of this vehicle stability control flag, a determination can be made as to whether or not the positioning of the vehicle requires the execution of vehicle stability control processing.

Furthermore, data relating to the controlled wheel and the non-controlled wheels are also acquired at step 401. This data is the data output from the brake ECU 6 in step 103 of FIG. 5. The data for the controlled wheel and non-controlled wheels show whether the vehicle is in a state of understeer or oversteer, meaning provided the controlled wheel and the non-controlled wheel can be distinguished, any wheel that may have blown can be identified. For example, oversteer can arise in a case where the inside turning wheel has developed a narrower turning radius than the outside turning wheel, and this may indicate a blown tire on the inside turning wheel. Accordingly, by acquiring data for the controlled wheel and the non-controlled wheels, the wheel that may have a blown tire can be identified. In the control portion 32b, the portion that executes processing for identifying any wheel that may have a blown tire corresponds with the tire air pressure reduction detection means.

Subsequently, in step 403, a determination is made as to whether vehicle stability control is currently being executed. If a "No" result is returned at this step, then the positioning of the vehicle is stable and there is no chance of a blown tire and consequently the process ends. In contrast, if a "Yes" result is returned, then the positioning of the vehicle is unstable, meaning a tire may have blown. In this case, the process proceeds to step 405.

In step 405, a determination is made as to whether the positioning of the vehicle has undergone a sudden change and, thus, requires a reduction in tire air pressure. In this step, a vehicle sideslip angle that is even larger than the sideslip angle used as a threshold in step 101 of FIG. 5, namely, an angle that is considered too large to deal with through vehicle stability control, is set as a threshold. The determination of a sudden change is made on the basis of whether or not the current sideslip angle has exceeded this threshold. In the control portion 32b, the portion that executes the processing associated with step 405 corresponds with the vehicle positioning sudden change detection means.

In this manner, if the vehicle positioning is only changing to an extent that can be stabilized by the vehicle stability control processing, then a blown tire is deemed impossible. Accordingly, processing ends without the need to execute a reduction in tire air pressure. In such a case, the positioning of the vehicle can be stabilized using only vehicle stability control.

On the other hand, in those cases where the positioning of the vehicle is undergoing such sudden change that the vehicle stability control processing is unable to stabilize the vehicle, a blown tire is deemed to have occurred. Accordingly, a reduction in tire air pressure is required, and so the process proceeds to step 407, and a tire air pressure control signal, commanding a reduction in the tire air pressure, is output to the transmitters 12 at the pressure reduction target wheels.

When this type of tire air pressure control signal is output, each transmitter 12 inputs the command to the control portion 22a via the antenna 23 and the transceiver portion 22b. The control portion 22a then operates the tire air pressure adjustment mechanism 25, thereby reducing the air pressure at the pressure reduction target wheel.

Specifically, the coil 25e is activated by the control portion 22a, and the magnetic attraction generated by the coil 25e attracts the lid 25b. This causes the lid 25b to slide towards the resin portion 25d, against the resistance of the spring 25c, thereby opening the air valve. As a result, air is released through the through hole 25g formed in the resin portion 25d and the air flow channel 25f formed in the cylinder portion 25a, thus reducing the air pressure in the tire.

As described above, normal stabilization of the positioning of the vehicle is achieved through vehicle stability control processing, but in cases such as a blown tire, when the vehicle begins to spin, the positioning of the vehicle may not be able to be adequately stabilized using only vehicle stability control. In these cases, better stabilization of the vehicle can be achieved by reducing the air pressure within the non-blown tires.

The embodiment described above includes reducing the tire air pressure in the case of a blown tire, but the amount by which the air pressure is reduced may also be varied in accordance with either the magnitude of the sudden change in the vehicle positioning or the remaining air pressure within the blown tire.

Furthermore, in the above embodiment, a sudden change in the vehicle positioning was detected on the basis of the vehicle sideslip angle, but a sudden change could also be detected on the basis of the tire air pressure detected by the tire air pressure detection control apparatus. For example, a tire could be identified as having blown if the gradient of the reduction in tire air pressure exceeded a predetermined threshold. This would indicate a sudden change in the vehicle positioning, and tire air pressure reduction could then be conducted as described above. In this case, all of the wheels other than that deemed to have suffered a blown tire are designated as pressure reduction target wheels.

The steps shown in the figures correspond with the means for executing the various processing.

What is claimed is:

1. A vehicle positioning control apparatus comprising:
   vehicle positioning detection means for detecting a physical quantity indicating a positioning of a vehicle;
   vehicle positioning sudden change detection means for detecting sudden changes in said positioning of said vehicle based on said physical quantity detected by said vehicle positioning detection means;
   tire air pressure reduction detection means for detecting which of a plurality of wheels provided on said vehicle has undergone a reduction in tire air pressure relative to tire air pressures of the other wheels; and
   a plurality of tire air pressure adjustment mechanisms respectively provided at the plurality of wheels to enable reduction of the tire air pressures of each of said plurality of wheels, wherein
   upon said vehicle positioning sudden change detection means detecting a sudden change in positioning of said vehicle, all wheels other than the wheel detected by said tire air pressure reduction detection means are designated as pressure reduction target wheels, and the tire air pressure of each of said pressure reduction target wheels is reduced by said tire air pressure adjustment mechanism provided at said pressure reduction target wheels.

2. The vehicle positioning control apparatus according to claim 1, further comprising:
   sideslip angle detection means for detecting an angle of sideslip of said vehicle, wherein
   said vehicle positioning sudden change detection means detects a sudden change in positioning of said vehicle when said angle of sideslip detected by said sideslip angle detection means exceeds a predetermined threshold.

3. The vehicle positioning control apparatus according to claim 2, wherein said tire air pressure reduction detection means detects whether said vehicle is in one of a state of oversteer and a state of understeer based on said angle of sideslip detected by said sideslip angle detection means, thereby detecting a reduction in said tire air pressure.

4. The vehicle positioning control apparatus according to claim 1, further comprising:
   tire air pressure detection means for detecting tire air pressure at each of said plurality of wheels, wherein
   said tire air pressure reduction detection means detects a reduction in said tire air pressure based on the tire air pressure detected by said tire air pressure detection means.

5. The vehicle positioning control apparatus according to claim 1, further comprising:
  tire air pressure detection means for detecting tire air pressure at each of said wheels, wherein
  said tire air pressure detection means includes a transmitter provided at an air valve of each of said wheels, said transmitter for transmitting a signal corresponding with the tire air pressure at said wheel, and said tire air pressure adjustment mechanism is provided at said transmitter, and
  when a reduction in tire air pressure is detected by said tire air pressure reduction detection means, a signal to reduce tire air pressure is sent to said transmitter, and tire air pressure is reduced by opening said air valve with said tire air pressure adjustment mechanism.

6. A method of controlling a positioning of a vehicle comprising:
  detecting a physical quantity indicating a positioning of the vehicle;
  detecting a sudden change in said positioning of said vehicle based on said physical quantity;
  providing one of a plurality of tire air pressure adjustment mechanisms at each of a plurality of wheels of the vehicle;
  detecting a subject wheel of said plurality of wheels, said subject wheel having undergone a reduction in tire air pressure compared to the other wheels;
  designating all of said plurality of wheels other than said subject wheel as pressure reduction target wheels; and
  reducing the tire air pressure of said pressure reduction target wheels by actuating each of said tire air pressure adjustment mechanisms associated therewith.

7. The method according to claim 6, wherein detecting a physical quantity includes detecting an angle of sideslip of said vehicle and said sudden change is detected when said sideslip angle exceeds a predetermined threshold.

* * * * *